United States Patent [19]

Weiner

[11] Patent Number: 4,645,416

[45] Date of Patent: * Feb. 24, 1987

[54] VALVE AND MANIFOLD FOR COMPRESSOR BORE HEATING

[75] Inventor: Harvey I. Weiner, South Windsor, Conn.

[73] Assignee: United Technologies Corporation, Hartford, Conn.

[*] Notice: The portion of the term of this patent subsequent to Mar. 18, 2003 has been disclaimed.

[21] Appl. No.: 667,031

[22] Filed: Nov. 1, 1984

[51] Int. Cl.[4] .............................................. F04D 29/00
[52] U.S. Cl. .................................... 415/115; 415/176
[58] Field of Search ............... 60/39.07, 726, 39.29, 60/39.83; 415/115, 116, 108, 126–128, 177–180, 144, 145, 175, 176

[56] References Cited

U.S. PATENT DOCUMENTS

| | | | |
|---|---|---|---|
| 2,837,270 | 6/1958 | Chapman | 415/145 |
| 3,031,132 | 4/1962 | Davies | 415/115 X |
| 3,647,313 | 3/1972 | Koff | 415/116 X |
| 3,844,110 | 10/1974 | Widlansky et al. | 60/39.08 |
| 3,945,759 | 3/1976 | Bobo | 415/145 |
| 4,230,436 | 10/1980 | Davison | 415/175 X |
| 4,268,221 | 5/1981 | Monsarrat et al. | 415/175 X |
| 4,329,114 | 5/1982 | Johnston et al. | 415/116 X |

Primary Examiner—Louis J. Casaregola
Attorney, Agent, or Firm—Norman Friedland

[57] ABSTRACT

The bore of the compressor of a gas turbine engine is selectively heated by mid-stage compressor bleed air and a higher stage compressor bleed air utilizing a two position valve integral with the engine case and manifold with provision for fail-safe in the lower temperature bleed air position.

2 Claims, 1 Drawing Figure

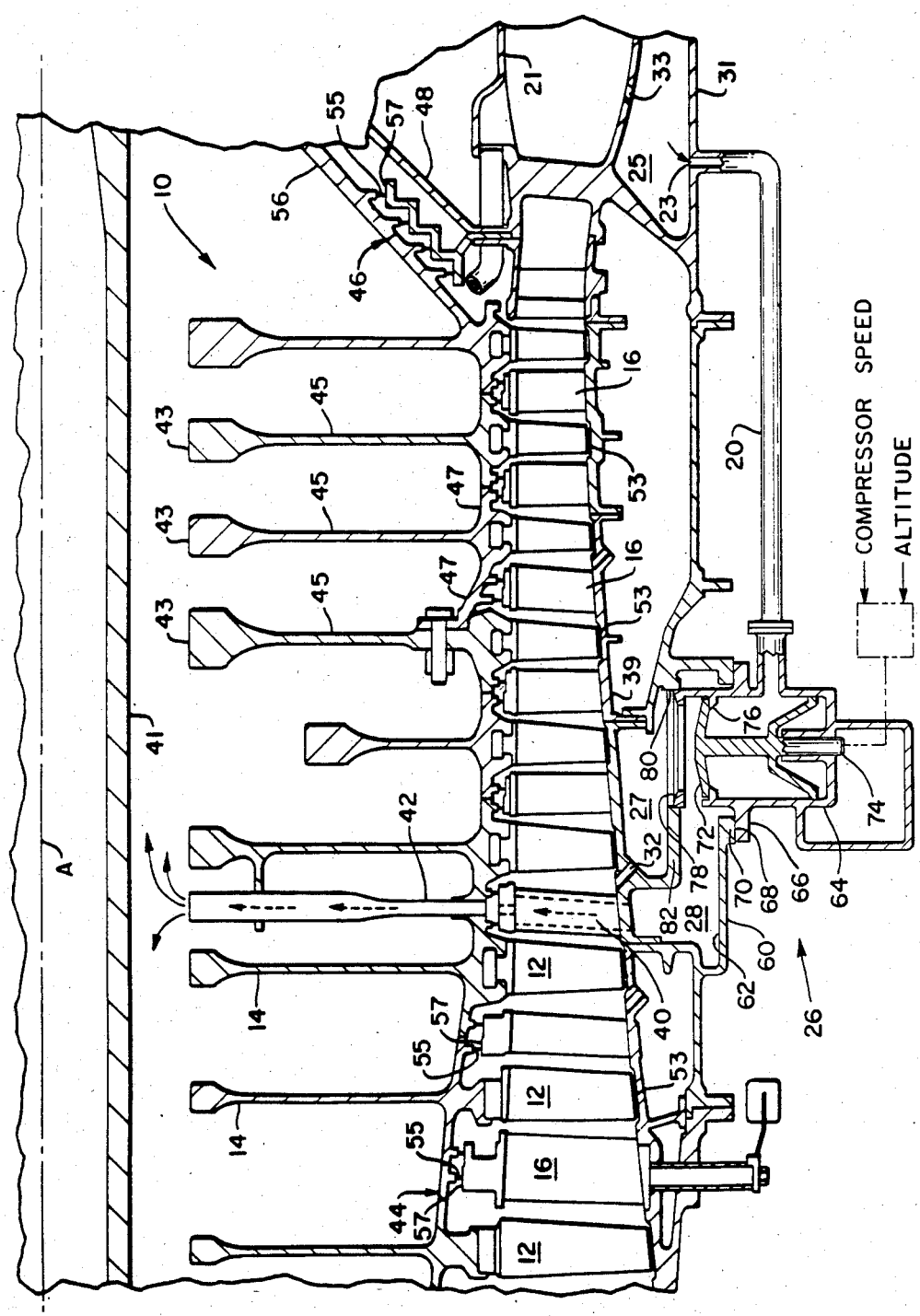

VALVE AND MANIFOLD FOR COMPRESSOR BORE HEATING

DESCRIPTION

1. Tehcnical Field

This invention relates to gas turbine engines and particularly to the active clearance control for selectively heating the bore of the compressor to reduce tip clearance.

2. Background Art

A method for reducing clearance between the tips of the blades of an axial flow compressor and its outer air seal is to selectively heat the bore to thermally grow the blades toward the outer air seals which are grounded to the engine case. For example, my co-invention for U.S. patent application Ser. No. 548,466 filed on Nov. 3, 1983 and assigned to the same assignee as this patent application discloses such a system that uses mid-stage compressor air and a downstream stage of hotter air to selectively heat the bore. In this system the air is bled from the compressor through openings in the engine case and is ducted externally to the feed system for admitting the air into the compressor bore.

DISCLOSURE OF INVENTION

I have found that the system described above can be simplified by fabricating the engine case to include both the manifold for collecting the air to be admitted into the compressor bore and employing an integral valve adapted to fit a boss formed on the engine case. The valve is particularly designed so that it is fail safe in the cooler position rather than the hotter one as will be apparent from the description hereinbelow.

By virtue of this invention the components of the system are not only less expensive to fabricate but eliminate outside piping resulting in lower weight while at the same time achieving the following advantages:

1. Because the two-positional valve is mounted internally and eliminates the external piping the associated pressure loss in the cooler air supply is minimized.
2. The invention contemplates a fail-safe operation by shutting off the hotter air supply and exposing the cooler air to the bore.
3. By casting the manifold integral with the engine case, assembly of the components is facilitated and bolted joints are eliminated, and
4. The valve is easily removed without disturbing the remaining portion of the system.

Other features and advantages will be apparent from the specification and claims and from the accompany drawings which illustrate an embodiment of the invention.

BRIEF DESCRIPTION OF DRAWINGS

The sole FIGURE is a partial view partly in section and partly in schematic of a turbine type power plant showing the details of this invention.

BEST MODE FOR CARRYING OUT THE INVENTION

While this invention is described in connection with a twin spool gas turbine engine of the type exemplified by the models JT9D, PW2037 and PW4000 engines manufactured by Pratt & Whitney Aircraft Division of United Technologies Corporation, the assignee of this patent application, it is to be understood that this invention has application on other types of gas turbine engines. As mentioned in the above, in its preferred embodiment the invention is employed on the high compressor of the twin spool engine where the compressor air is bled at stages having a higher pressure and temperature than the point in the engine where it is returned. As can be seen in the sole FIGURE which shows a portion of the high compressor section generally illustrated by reference numeral 10 as consisting of stages of compression comprising rotors having blades 12 and its attendant disks 14 and a plurality of rows of stator vanes 16. Obviously, as the air progresses downstream, because of the work being done to it by the rotating compressor blades, it becomes increasingly pressurized with a consequential rise in temperature.

Air is bled from the 9th stage of compression and a higher stage which is the last stage (15th) in this instance. As is typical in this type of engine, the air discharging from the compressor is diffused through a diffuser 21 prior to being fed into the combustor. For the sake of design simplicity, the 15th stage air is bled from the diffuser case 21 through the bleed 33 into the cavity 25 surrounding the diffuser where it is piped out of the engine through the opening 23 in the outer case 31 and the externally mounted conduit 20, and then fed to valve generally illustrated by reference numeral 26. Similarly, air from the 9th stage is bled into the cavity 27 surrounding the compressor inner case 39 through the bleed 32 and conducted to the bore 43 via valve 26 in the manner to be described hereinbelow.

This bled air is directed into the bore area of the compressor by valve 26 where it is directed radially inward toward the engine centerline A. To accommodate this flow which is in a direction opposing the centrifugal field created by the rotating rotor and shaft one or more vanes 40 are made hollow and communicate with cavity 28. A plurality of anti-vortex tubes 42 (one being shown but the number selected being determined by the flow desired) are attached to the spacer 47 and rotate therewith and communicate with the flow discharging from the ends of the hollow vanes 40 and terminate in close proximity to shaft 41. Because of the pressure selected for the bled air which is controlled by the designed pressure drop, a portion of the air will flow forward in the bore area while the majority of the air will flow rearward relative to the directio0 of flow of the engines fluid working medium. As the air passes through the bores 43 of the disks 14 a portion will scrub the webs 45 and spacers 47 and the heat content transferred from this bled air will cause the disks to expand and hence urge the attached blades 12 toward the peripheral seals 53 and control the gap therebetween.

Similarly, the various labyrinth seals in the compressor section, as in this case, labyrinth seals 44 and 46, will likewise expand and minimize the gap. As shown, the knife edge 55 attached to the outer diameter of spacer 47 will be expanded and contracted as a function of the temperature of the bled air fed into the bore area of the compressor and will move toward and away from land 57. (Although certain elements are differently dimensioned, it carries the same reference numeral if its function is the same).

To this end, valve 26 is controlled in any well known manner so that air from the 9th stage is fed to the bore area during high powered engine operation such as takeoff and the 15th stage bled air is connected during a reduced power such as aircraft's cruise condition. The higher stage, obviously, is at the higher temperature so as to heat the bore area and cause the disks to grow radially outward and close the gap between the tips of the blades and its peripheral seal. Also, the labyrinth seals 46 & 44 are likewise heated so as to maintain a minimal gap.

By proper modulation of valve 26 in response to appropriate commands, the temperature and volumetric flow of air can be suitably regulated. For an example of a control system that would be appropriate, reference should be made to the aforementioned Redinger et al patent, which is incorporated herein by reference.

In accordance with this invention, valve 26 is a two positional valve either communicating the bores 43 of the compressor with 9th stage bleed air or 15th stage bleed air and is made integral with the engine case. To accommodate the valve 26 the engine case is extended radially at the portion indicated by reference numeral 60 and extends circumferentially to define a manifold 62 accommodating the air to be fed to the anti-vortex tube 42. Valve housing 64 is mounted with its complementary flanges 66 to the flanges 68 of the boss 70 formed in casing 60.

Valve 26 comprises a valve element 72 and valve stem 74 suitably supported in valve housing 64 for rectilinear motion. The valve stem 74 is connected to and actuated as schematically illustrated which responds to output commands to position valve element to seat 76 to block off the high presure 15th stage air (as shown) or to seat 78 circumscribing the circular opening 80 formed in the extension 82 of the inner case 39 to block off 9th stage air.

To assure that the valve element 72 blocks off the higher presure air in the event of a valve malfunction, the valve element 72 is designed so that a greater area is exposed to 9th stage bleed air than is exposed to 15th stage bleed air. Consequently, in the event of a malfunction, since the area is greater notwithstanding the fact that the 15th stage bleed air is at a higher pressure the valve element 72 will seat on seat 76.

It should be understood that the invention is not limited to the particular embodiments shown and described herein, but that various changes and modifications may be made without departing from the spirit and scope of this novel concept as defined by the following claims.

I claim:

1. For a gas turbine engine having an engine case housing a compressor rotor having compressor blades extending in the bore of the engine case, means for selectively heating the bore to expand said compressor rotor so as to maintain a limited clearance of the tips of the said compressor blades, said means including a valve having a first and second position, the engine casing being enlarged to accommodate said valve and defining a manifold, connecting means for leading mid-stage compressor bleed air into said manifold and a higher stage compressor bleed air into said manifold, said valve interconnecting said bore and said manifold for selectively injesting mid-stage compressor bleed air and a higher stage compressor bleed air into said bore and control means for positioning said valve to said first position and alternately to said second position.

2. For a gas turbine engine as in claim 1 wherein said valve includes a valve element having a pair of opposing surfaces, one surface being exposed to mid-stage bleed and the other surface being exposed to the higher stage bleed wherein said valve element is automatically urged to conduct mid-stage bleed air to said bore in the event said control means become inoperative.

* * * * *